United States Patent Office.

JOHN THOMAS, OF HOKENDAUQUA, PENNSYLVANIA.

Letters Patent No. 111,789, dated February 14, 1871.

IMPROVEMENT IN REMOVING SLAG FROM FURNACES.

The Schedule referred to in these Letters Patent and making part of the same.

*To all whom it may concern:*

Be it known that I, JOHN THOMAS, of Hokendauqua, in the county of Lehigh and State of Pennsylvania, have invented a new and improved Mode of Removing Slag; and I do hereby declare that the following is a full, clear, and exact description thereof, which will enable others skilled in the art to make and use the same.

This invention relates to an improved mode of removing the slag used in furnaces as a flux, after it has performed its office and is allowed to flow away; and It consists in running it, while in a fluid state, into a strong current of water, which, by its chemical action on the lime contained in it, disintegrates the slag or liquid cinder so that it will flow along with the current to some convenient place of deposit, thereby saving the expense of removing it in carts after it has congealed, as is now the practice.

Having thus described my invention,

I claim as new and desire to secure by Letters Patent—

The improved mode of removing slag or liquid cinder by discharging it, while in a liquid state, into a strong current of running water, whereby it is disintegrated and flows away with the water, all substantially as specified.

JOHN THOMAS.

Witnesses:
    THEO. H. GREEN,
    S. C. WOLLE.